United States Patent
Rateick, Jr. et al.

(10) Patent No.: US 7,469,626 B2
(45) Date of Patent: Dec. 30, 2008

(54) SPLIT CERAMIC BORE LINER, ROTOR BODY HAVING A SPLIT CERAMIC BORE LINER AND METHOD OF LINING A ROTOR BORE WITH A SPLIT CERAMIC BORE LINER

(75) Inventors: Richard G. Rateick, Jr., South Bend, IN (US); Douglas A. Hall, Niles, MI (US); Larry A. Portolese, Granger, IN (US); Scott T. Wakeman, Fairfax, VA (US)

(73) Assignee: Honeywell International, Inc., Morristown, NJ (US)

( * ) Notice: Subject to any disclaimer, the term of this patent is extended or adjusted under 35 U.S.C. 154(b) by 448 days.

(21) Appl. No.: 11/192,268

(22) Filed: Jul. 29, 2005

(65) Prior Publication Data

US 2007/0039157 A1    Feb. 22, 2007

(51) Int. Cl.
*F02F 1/16* (2006.01)
*F02B 3/00* (2006.01)

(52) U.S. Cl. .................... 92/171.1; 29/888.061
(58) Field of Classification Search ................ 92/171.1; 29/888.061
See application file for complete search history.

(56) References Cited

U.S. PATENT DOCUMENTS

| | | | | |
|---|---|---|---|---|
| 813,536 | A * | 2/1906 | Thier | 138/147 |
| 2,170,015 | A * | 8/1939 | Ford | 92/171.1 |
| 2,283,424 | A * | 5/1942 | Colwell et al. | 29/888.061 |
| 2,635,021 | A * | 4/1953 | Alward | 384/282 |
| 3,550,233 | A * | 12/1970 | Harrison et al. | 91/499 |
| 3,601,012 | A | 8/1971 | Oram | |
| 3,709,108 | A * | 1/1973 | Alger et al. | 92/169.1 |
| 3,863,701 | A | 2/1975 | Niimi et al. | |
| 4,419,971 | A * | 12/1983 | Nakamura et al. | 123/193.2 |
| 4,465,040 | A | 8/1984 | Pelizzoni | |
| 4,800,801 | A * | 1/1989 | van Zweeden | 417/269 |
| 4,841,927 | A * | 6/1989 | Slee | 123/193.2 |
| 5,177,037 | A | 1/1993 | Schuldies | |
| 5,581,881 | A * | 12/1996 | Sherman et al. | 29/888.061 |
| 5,638,735 | A | 6/1997 | Ota et al. | |

(Continued)

FOREIGN PATENT DOCUMENTS

DE    3437999 A1    4/1986

(Continued)

OTHER PUBLICATIONS

European Search Report EP06118055.0 dated Feb. 21, 2008.

*Primary Examiner*—Thomas E Lazo
(74) *Attorney, Agent, or Firm*—Ingrassia Fisher & Lorenz, P.C.

(57) ABSTRACT

A rotor body (22) having a plurality of cylindrical bores (24) each adapted to receive a piston (30) for reciprocating movement therein, each of the bores (30) being lined with a ceramic liner (42) having a first split (44), and a method of forming a rotor (16) having a ceramic bore liner (42) that includes the steps of providing a rotor body having at least one bore (140), providing a ceramic bore liner having a first end, a second end and a split having a width (142), and compressing the bore liner to decrease the width and securing the bore liner in the at least one bore (144).

10 Claims, 5 Drawing Sheets

U.S. PATENT DOCUMENTS

| | | | |
|---|---|---|---|
| 5,870,990 A * | 2/1999 | Sczepanski | 123/193.2 |
| 6,254,948 B1 | 7/2001 | Hellmig | |
| 6,289,790 B1 | 9/2001 | Rey | |
| 6,672,199 B2 | 1/2004 | Schwarzkopf | |
| 6,802,244 B1 | 10/2004 | Stoppek et al. | |
| 6,895,856 B1 | 5/2005 | Lonneborg | |
| 7,188,562 B2 * | 3/2007 | Hansen et al. | 92/71 |

FOREIGN PATENT DOCUMENTS

| | | |
|---|---|---|
| DE | 4301126 A1 | 1/1994 |
| JP | 58167848 | 10/1983 |
| JP | 09324694 A * | 12/1997 |

* cited by examiner

SPLIT CERAMIC BORE LINER, ROTOR BODY HAVING A SPLIT CERAMIC BORE LINER AND METHOD OF LINING A ROTOR BORE WITH A SPLIT CERAMIC BORE LINER

FIELD OF THE INVENTION

The present invention is directed toward a ceramic bore liner, a rotor body including a ceramic bore liner and a method of lining the bore of a rotor body with a ceramic liner, and, more specifically, toward a split ceramic bore liner configured to resist cracking during installation and operation, a rotor body having a split ceramic bore liner installed therein, and a method of installing a split ceramic bore liner in a rotor body to resist bore liner cracking during installation and operation.

BACKGROUND OF THE INVENTION

Fluid transfer devices are known that operate in a first direction as a pump and in a second direction as a motor. These devices may comprise a housing within which a rotor rotates with respect to a port plate and a cam plate angled with respect to the rotor's axis of rotation. The rotor includes one or more bores (generally an odd number) each for receiving a piston. One end of each piston held in contact with the cam plate. As the rotor rotates with respect to the housing, each piston moves axially with respect to the rotor and the port plate.

The port plate includes a fluid inlet through which a fluid enters the housing when a piston aligned with the fluid inlet moves away from the port plate and a fluid outlet through which fluid exits the housing when a piston aligned with the fluid outlet moves toward the port plate. When the rotor is connected to a source of motive power, the rotation of the rotor causes the pistons to draw fluid from the inlet and expel fluid through the outlet; when operated in this manner, the fluid transfer device is referred to as an axial piston pump. When fluid is applied under pressure to the fluid inlet and drawn from the fluid outlet at a lower pressure, the rotor is caused to turn by the pressure difference; when operated in this manner, the fluid transfer device is referred to as a hydraulic motor. Thus "axial piston pump" and "hydraulic motor" may refer to the same fluid transfer device, depending on the what is making the rotor turn.

It is known to provide rotor bores with a ceramic or metal liner to improve wear resistance and achieve satisfactory tribological performance. These liners may be thin-walled, right circularly cylindrical tubes that are shrink fitted into typically metallic rotors. A shrink fit, press fit, braze or similar type of connection is desirable to retain the liner in the bore under typical operation. Unfortunately, non-symmetrical stresses to the liner can be imparted during installation (or occur during use) and these stresses can crack the brittle ceramic bore liners.

SUMMARY OF THE INVENTION

These problems and others are addressed by various embodiments of the present invention, a first aspect of which comprises a bore liner formed from a ceramic sleeve having a first end, a second end and a sidewall having a split.

Another aspect of the invention comprises a rotor body having a plurality of cylindrical bores each adapted to receive a piston for reciprocating movement therein and each being lined with a ceramic liner having a split.

An additional aspect of the invention comprises a method of forming a rotor having a ceramic bore liner that includes the steps of providing a rotor body having at least one bore, providing a ceramic bore liner having a first end, a second end and a split having a width, and compressing the bore liner to decrease the width and securing the bore liner in the at least one bore.

BRIEF DESCRIPTION OF THE DRAWINGS

These aspects and features of the invention and others will be better understood after a reading of the following detailed description together with the following drawings of which.

DETAILED DESCRIPTION

Figure 1:
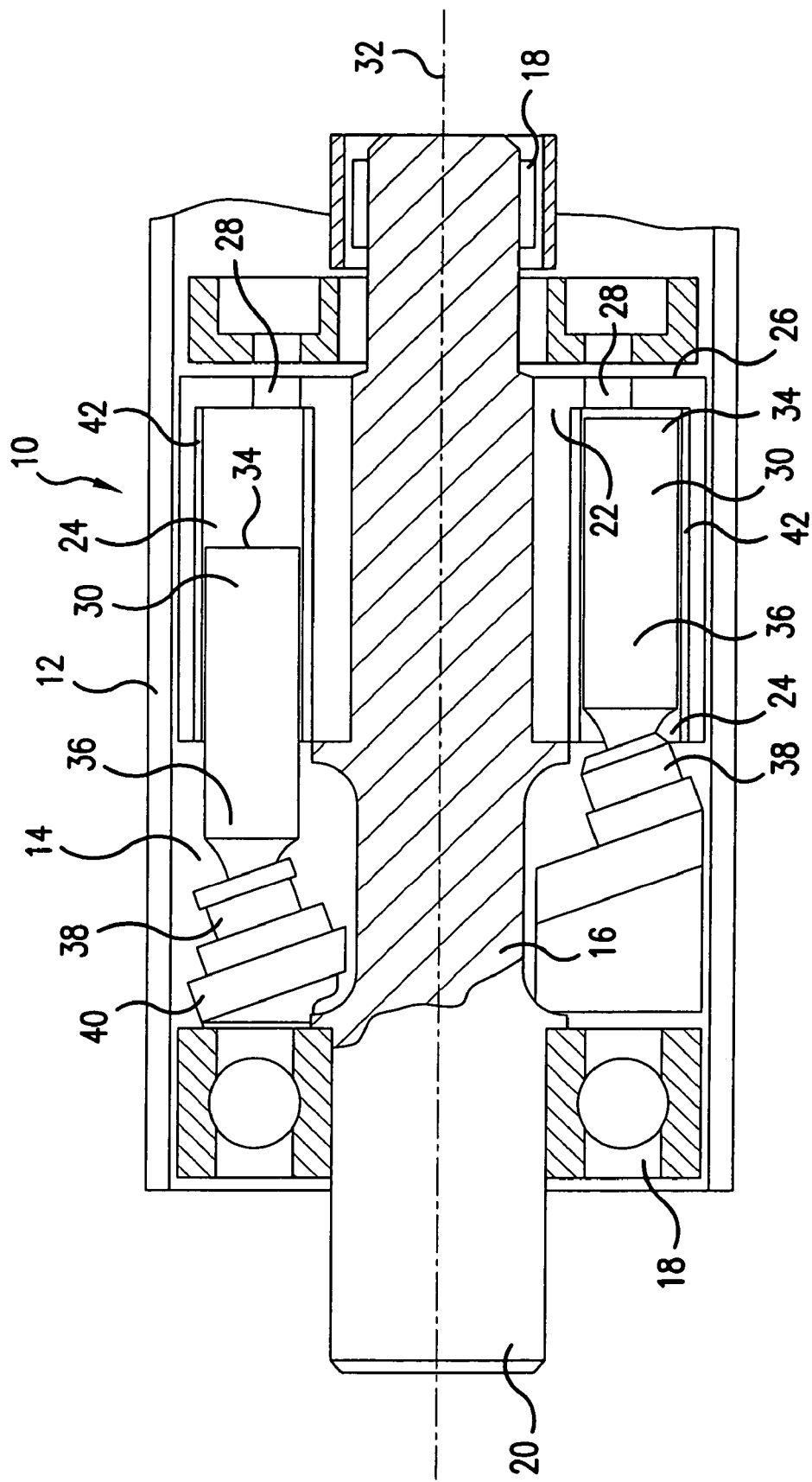
FIG. 1 is side elevational view, partly in section, of a rotor having bores with split ceramic liners and pistons slidably mounted in the bores.

Referring now to the drawings, wherein the showings are for purposes of illustrating several presently preferred embodiments of the invention only and not for the purpose of limiting same, FIG. 1 illustrates a fluid transfer device 10 comprising a housing 12 having an interior 14 in which a rotor 16 is mounted for rotation. Rotor 16 is supported by first and second sets of bearings 18 and comprises a rotor shaft 20 and a rotor body 22. Rotor body 22 includes a plurality of cylinders 24, two of which are illustrated in FIG. 1. Generally, an odd number of cylinders will be provided. Rotor body 22 includes a balance land or front face 26 having first and second openings 28 communicating with cylinders 24. First and second pistons 30 are mounted for sliding movement in cylinders 24 in an axial direction generally parallel to the axis 32 of rotor shaft 20. Each of pistons 30 includes a first end 34 facing openings 28 and a second end 36 projecting from rotor body 22 and terminating in a shoe assembly 38. A cam plate 40 (also known as a swash plate) is mounted in interior 14 of housing 12, and shoe assembly 38 are held against the cam plate 40.

Figure 2:
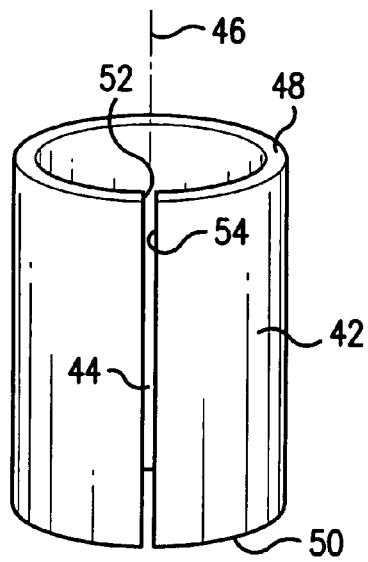
FIG. 2 is a split ceramic bore liner according to a first embodiment of the present invention.

Each of the cylinders 24 includes a ceramic bore liner 42, having, as illustrated in FIG. 2, at least one split 44 and a longitudinal axis 46. Bore liners 42 may be formed from a ceramic material such as, but not limited to alumina, silicon nitride, silicon carbide, or a cermet such as tungsten-carbide cobalt. For certain types of processing, such as electro-discharge machining (EDM), it may be desirable to use a ceramic such as the material disclosed in U.S. Pat. No. 5,177,037 to Schuldies, the disclosure of which is hereby incorporated by reference. Other ceramic materials known to those of ordinary skill in the art may also be used based on the operating requirements of the fluid transfer device without departing from the present invention.

Figure 12:
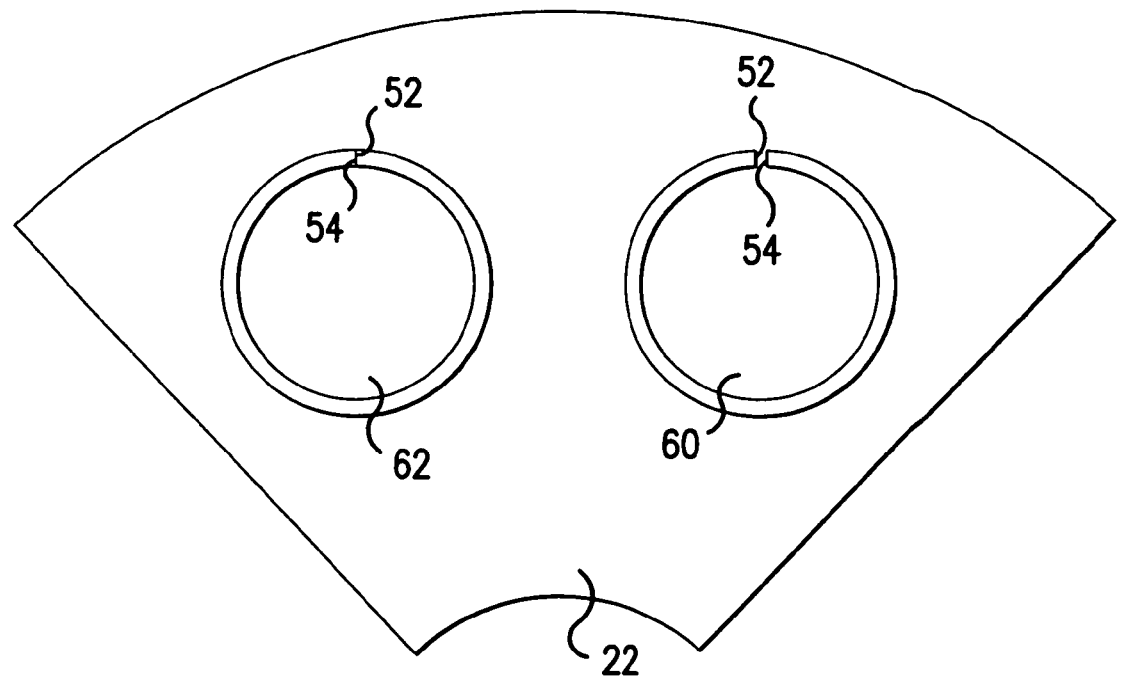
FIG. 12 is a partial end elevational view of the rotor of FIG. 1 having two different split ceramic bore liners installed therein.

With continued reference to FIG. 2, bore liner 42 includes a split 44 extending from a first end 48 to a second end 50. The split 44 is defined by a first wall 52 spaced from a second wall 54. First and second walls 52, 54, generally lie in parallel planes which may project on opposite sides of axis 46 as illustrated in FIG. 2 making split 44 generally normal to axis 46. When bore liner 42 is installed in a rotor, first wall 52 and second wall 54 may remain spaced, as shown in bore 60 in FIG. 12, or may contact one another when the bore liner 42 is compressed to fit within a bore as illustrated in bore 62. Generally all bore liners in a given rotor will have similar gaps; FIG. 12 includes one bore liner having spaced walls and a second bore liner having a gap between two walls for illustration purposes only.

Split 42 may be formed in any of a variety of ways. For example, an uncured ceramic cylinder may be provided with a suitable split prior to densification. Alternately, a densified ceramic cylinder can be cut or otherwise machined to produce a split. Such cutting operations may be carried out by, for example, diamond grinding, abrasive water jet cutting, laser cutting, ultrasonic machining or electro-discharge machining. The use of the term "split" herein is intended to describe the result of such an operation and is not intended to specify or limit the manner in which the split is formed.

In operation, pistons 30 reciprocate within bores 24 as rotor 20 rotates and fluid moves into and exits from bores 24. Pistons 30 have an outer diameter slightly smaller than the inner diameter of bores 24, therefore a certain amount of leakage occurs between the pistons 30 and walls of cylinders 24 during use. Advantageously, this leakage provides lubrication for pistons 30 and also helps to cool the pistons and the rotors. Leakage occurs whether or not a split is provided in bore liner 42; however split 44 can controllably increase leakage which in turn may help to better cool the pistons and rotor.

The distance between first wall 50 and second wall 52 is selected to provide for a desired degree of leakage and will be selected based on the anticipated operating temperatures and lubrication requirements of the rotor. The split can be sized so that first wall 50 and second wall 52 will contact one another in use, as illustrated in bore 60 of FIG. 12, when it is important to control leakage. Alternately, the split can be sized so that first wall 50 and second wall 52 remain spaced after the bore liner 42 is installed as illustrated in bore 62 in FIG. 12. Notably, whether first wall 50 and second wall 52 contact one another in use or remain spaced, the presence of split 44 helps to relieve stresses that occur during installation and use and should reduce the failure rate of the cylindrical bore liner.

Figure 3:
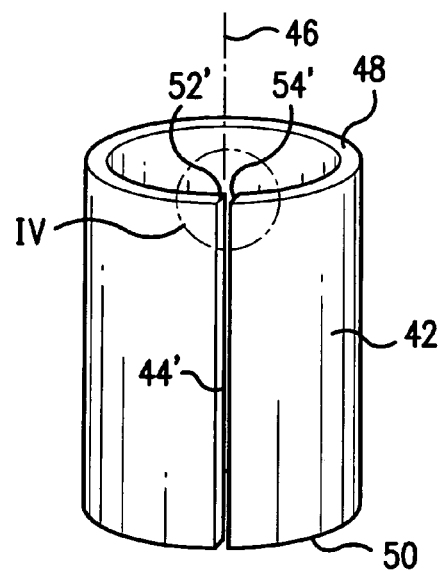
FIG. 3 is a split ceramic bore liner according to a second embodiment of the present invention.
Figure 4:
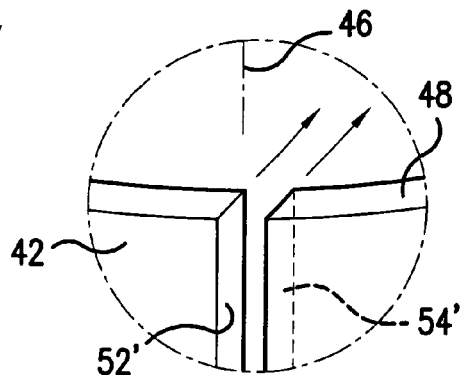
FIG. 4 is a detail view of region IV of FIG. 3.

A second embodiment of the present invention is illustrated in FIGS. 3 and 4 wherein elements common to the first embodiment are identified using the same reference numerals. Elements related to elements of the first embodiment are identified with a prime. In this embodiment, ceramic bore liner 42 includes a split 44' defined by a first wall 52' and a second wall 54' where the first and second walls 52', 54' lay in parallel planes both of which pass to the same side of longitudinal axis 46 of bore liner 42. This arrangement may help maintain a more constant rate of leakage even as the distance between first wall 50' and second wall 52' changes with temperature and operating conditions.

Figure 5:
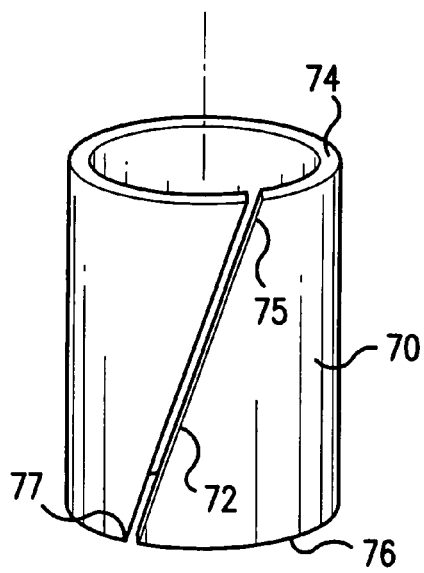
FIG. 5 is a split ceramic bore liner according to a third embodiment of the present invention.

A third embodiment of the invention is illustrated in FIG. 5. In this embodiment, a bore liner 70 includes a split 72 that extends from a first end 74 to a second end 76 of bore liner 70. In this embodiment, first end 75 of split 72 is circumferentially spaced from second end 77 while split 72 is generally linear.

Figure 6:
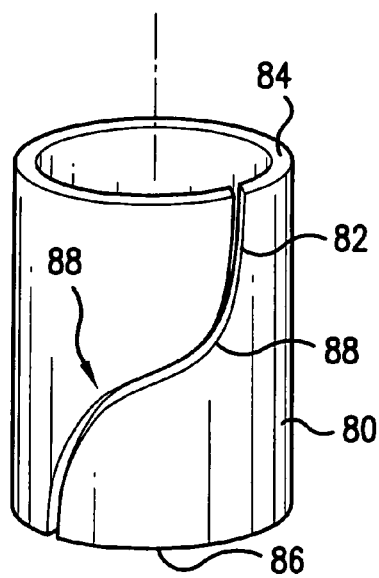
FIG. 6 is a split ceramic bore liner according to a fourth embodiment of the present invention.

A fourth embodiment of the invention is illustrated in FIG. 6. In this embodiment, a bore liner 80 has a split 82 that extends from a first end 84 to a second end 86 of bore liner 80 and includes first and second bends 88. Like the third embodiment discussed above, the ends of the split 82 of bore liner 80, as well as first and second bends 88, are circumferentially spaced.

Figure 7:
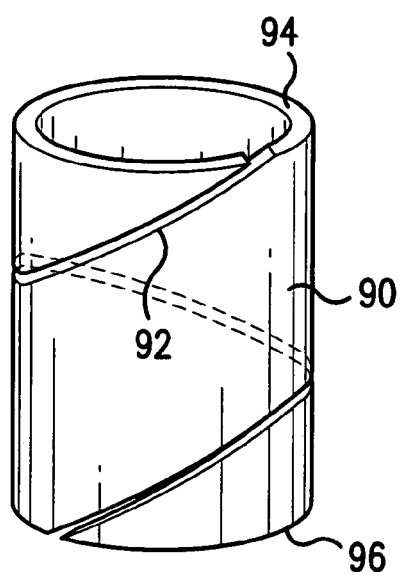
FIG. 7 is a split ceramic bore liner according to a fifth embodiment of the present invention.

A fifth embodiment of the invention is illustrated in FIG. 7 wherein a bore liner 90 having a helical split 92 is disclosed which split extends from a first end 94 to a second end 96 of bore 90. The use of such a helical split 92 should reduce the likelihood of liner failure and at the same time may help direct a leakage flow around the circumference of cylinder 24 and thus provide more even cooling. The configuration of the split could also be varied to provide greater or lesser cooling in different areas depending on the cooling needs of a particular cylinder and rotor. Helical split 92, by directing the leakage flow around the periphery of the cylinder, may also provide more even lubrication and help avoid the condition known as hydraulic lock. Hydraulic lock occurs when pressure due to leakage flow becomes greater on one side of a piston than on the other causing increased friction between the piston an cylinder on the under-lubricated side and often leading to piston or bore damage.

Figure 8:
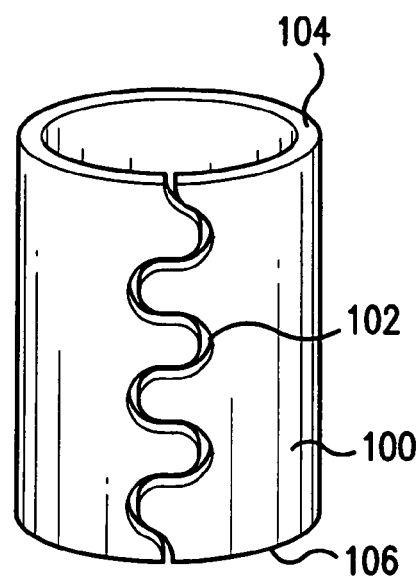
FIG. 8 is a split ceramic bore liner according to a sixth embodiment of the present invention.

FIG. 8 illustrates a sixth embodiment of the present invention in which a bore liner 100 includes a serpentine split 102 extending from a first end 104 to a second end 106 of the bore liner 100. This embodiment provides many benefits of the previous embodiments while at the same time may be useful for limiting a leakage flow from one end of the bore liner to the other due to the winding path that the leaking fluid must traverse.

Figure 9:
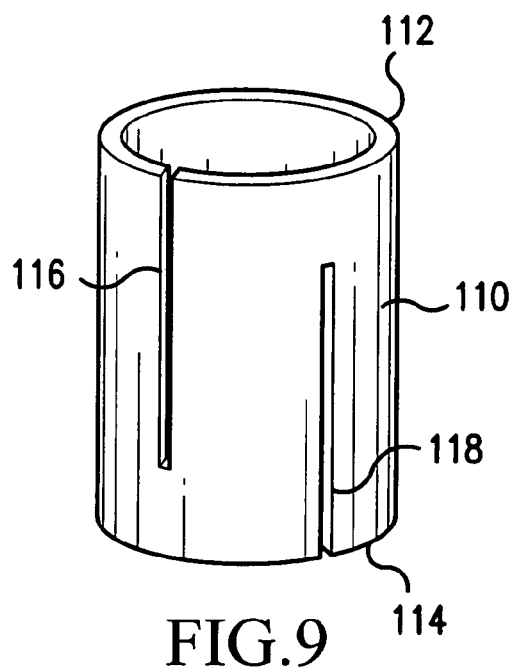
FIG. 9 is a split ceramic bore liner according to a seventh embodiment of the present invention.

FIG. 9 illustrates a seventh embodiment of the present invention in which a bore liner 110 includes a first end 112 and a second end 114. A first split 116 extends from first end 112 of bore liner 110 but does not extend as far as second end 114; a second split 118 extends from second end 114 of bore liner 110 but does not extend as far as first end 112. More than two splits may be provided, and the circumferential spacing of the splits may be varied. This arrangement may also help to minimize leakage flow while still improving the flexibility of and reducing the fracturing of the ceramic bore liner.

Figure 10:
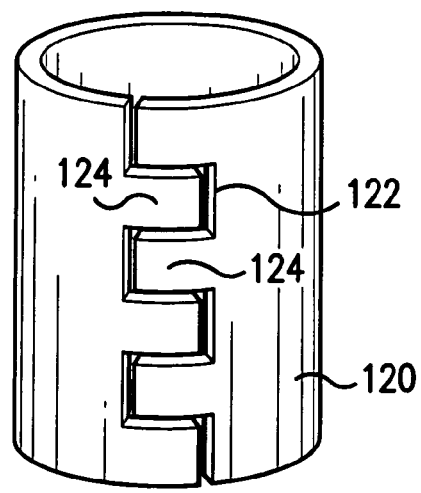
FIG. 10 is a split ceramic bore liner according to an eighth embodiment of the present invention.

FIG. 10 illustrates an eighth embodiment of the invention wherein a bore liner 120 is provided having a split 122 that defines a plurality of generally rectangular teeth 124 on either side of split 122.

Figure 11:
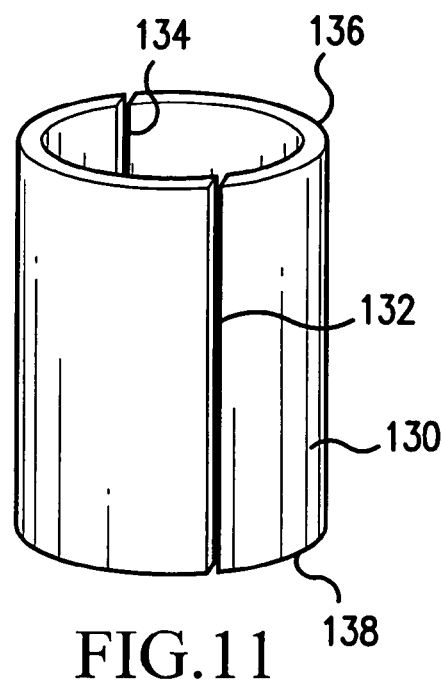
FIG. 11 is a split ceramic bore liner according to a ninth embodiment of the present invention.

FIG. 11 illustrates a ninth embodiment of the present invention wherein a ceramic bore liner 130 is provided having a first split 132 and a second split 134 each extending from a first end 136 to a second end 138 of the bore liner 130. While generally linear splits 132, 134 are illustrated, other split configurations or combinations of split configurations from the previously discussed embodiments could also be used. Since producing two splits 132, 134 results in a two-piece bore liner, the bore liner 130 can generally not be shrink fitted or press fitted into bore 24 as may optionally be done with the bore liners of the previous embodiments. Instead, it will generally be necessary to braze bore liner 130 in place.

Figure 13:
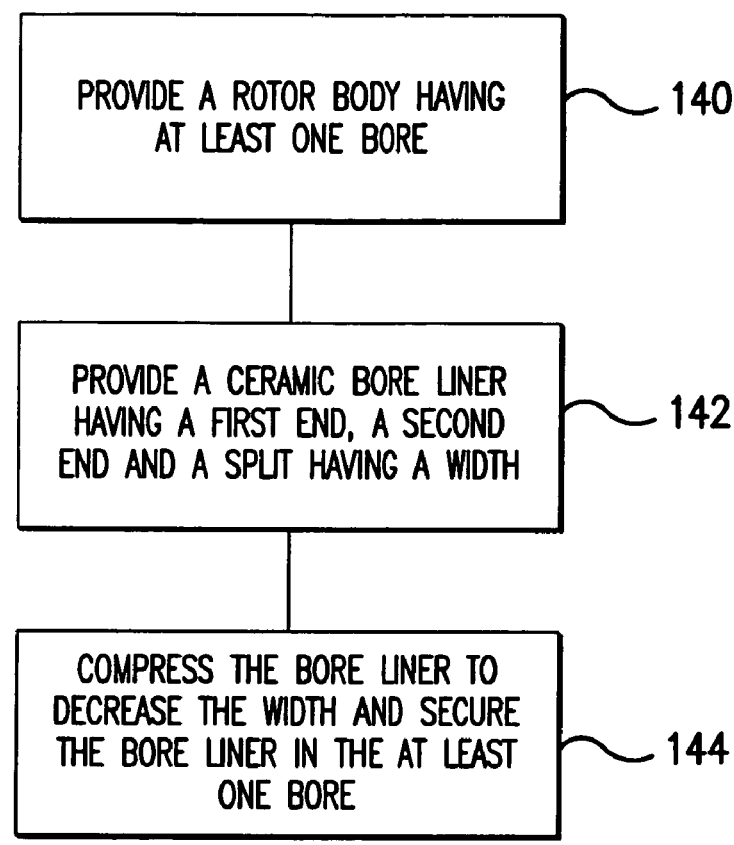
FIG. 13 illustrates a method of forming a rotor having a ceramic bore liner according to an embodiment of the invention.

A method of installing a ceramic bore liner according to one of the first through eighth embodiments of the invention will be described in connection with FIG. 13. As illustrated in this figure, a method of installing a ceramic bore liner includes the steps of providing a rotor body having at least one bore at a step 140, providing a ceramic bore liner having a first end, a second end and a split at a step 142 and compressing the bore liner to decrease the width of the split and securing the bore liner in the at least one bore at a step 144.

The present invention has been described herein in terms of several preferred embodiments. Variations and additions to these embodiments will become apparent to those skilled in the relevant arts upon a reading of the foregoing descriptions. It is intended that all such obvious modifications and additions form a part of the present invention to the extent they fall within the scope of the several claims appended hereto.

We claim:

1. A rotor body having a plurality of cylindrical bores each adapted to receive a piston for reciprocating movement therein, each of said bores being lined with a ceramic liner having a first end, a second end, a first split, and a second split, wherein said first split extends from the first end and does not reach said second end and wherein said second split extends from said second end and does not reach said first end, wherein a layer of braze is included between each of said ceramic liners and each of said bores.

2. The rotor body of claim 1 wherein said first split is defined by a first wall spaced from a second wall.

3. The rotor body of claim 1 wherein said first split is defined by a first wall in contact with a second wall.

4. The rotor body of claim 1 wherein each of said bores includes a longitudinal axis and the split of one of said bores is defined by first and second spaced walls, said first and second walls lying in first and second planes passing to a first side of said axis.

5. The rotor body of claim 1 wherein said first split is non-linear.

6. The rotor body of claim 1 wherein said first split is defined by first and second walls and a first portion of said first wall is circumferentially spaced from a second portion of said first wall.

7. The rotor body of claim 1 wherein each of said bore liners includes a first end spaced from a second end and said first split extends from said first end to said second end.

8. A method of forming a rotor having a ceramic bore liner comprising the steps of:
   providing a rotor body having at least one bore;
   forming a split in an uncured ceramic cylinder;
   densifying the ceramic cylinder to provide a ceramic bore liner having a first end, a second end and a split having a width; and
   compressing the bore liner to decrease the width and securing the bore liner in the at least one bore.

9. The method of claim 8 further comprising the step of providing another ceramic bore liner having a first end, a second end and a split having a width by forming a split in a ceramic cylinder by a process selected from the group consisting of diamond grinding, abrasive water jet cutting, laser cutting, ultrasonic machining and electro-discharge machining.

10. The method of claim 8 including the additional step of brazing the bore liner to the bore.

* * * * *